United States Patent [19]

Takahashi

[11] Patent Number: 4,534,214
[45] Date of Patent: Aug. 13, 1985

[54] SYSTEM FOR DIAGNOSING AN INTERNAL COMBUSTION ENGINE

[75] Inventor: Toshio Takahashi, Mitakashi, Japan

[73] Assignee: Fuji Jukogyo Kabushiki Kaisha, Tokyo, Japan

[21] Appl. No.: 535,507

[22] Filed: Sep. 26, 1983

[30] Foreign Application Priority Data

Oct. 1, 1982 [JP] Japan .................................. 57-173623

[51] Int. Cl.³ .......................................... G01M 15/00
[52] U.S. Cl. ..................................... 73/118; 73/117.3; 340/52 F
[58] Field of Search ..................... 73/116, 118, 119 R; 340/52 R, 52 F; 123/480, 494; 374/145

[56] References Cited

U.S. PATENT DOCUMENTS

| 3,938,075 | 2/1976 | Reddy | 340/52 R |
| 3,960,011 | 6/1976 | Renz et al. | 73/116 |
| 4,219,798 | 8/1980 | Frister | 340/52 F |
| 4,244,340 | 1/1981 | Herth et al. | 123/440 |
| 4,246,566 | 1/1981 | Endo et al. | 340/52 F |

Primary Examiner—Jerry W. Myracle
Attorney, Agent, or Firm—Martin A. Farber

[57] ABSTRACT

A system for diagnosing an internal combustion engine having a coolant temperature sensor. A coolant temperature diagnosing circuit is provided which is responsive to the output voltage of the sensor for producing a signal when the voltage exceeds a predetermined range. A fail-safe signal generating circuit is provided which is responsive to engine speed and to produce fail-safe signals dependent on the engine speed so as to prevent stalling of the engine.

2 Claims, 3 Drawing Figures

SYSTEM FOR DIAGNOSING AN INTERNAL COMBUSTION ENGINE

BACKGROUND OF THE INVENTION

The present invention relates to a diagnosis system for internal combustion engines, and more particularly to a system for diagnosing failure of a coolant temperature sensor of an engine mounted on a motor vehicle.

An electronic fuel-injection system of the type which is provided with a computer operable to compute various factors, such as throttle position, volume of intake airflow, intake manifold vacuum and coolant temperature in order to produce output signals for driving solenoid-operated injection valves is known. A coolant temperature sensor is provided to produce an output signal when the temperature rises to a predetermined value. The computer uses the output signal as an input signal representing engine warming-up. However, if a particular fault occurs, such as a disconnection of wires for the sensor or a short circuiting of the sensor, the sensor produces an output having an extreme value, which results in a failure in controlling the air-fuel ratio of injected fuel and in stalling of the engine.

SUMMARY OF THE INVENTION

It is an object of the present invention to provide a system for diagnosing fault in a coolant temperature sensor system, in which a quasi temperature signal is produced in accordance with engine speed and the quasi temperature signal is used as a coolant temperature signal so as to prevent failure of starting of an engine or stalling of the engine.

According to the present invention, there is provided a system for diagnosing an internal combustion engine having a coolant temperature sensor; a coolant temperature diagnosing circuit responsive to output voltage of said coolant temperature sensor for producing an output when said output voltage exceeds a predetermined range; means for generating output voltage dependent on engine speed; a fail-safe generating circuit responsive to said output voltage of said means for producing one of fail-safe signals in dependency on said output voltage; and switch means responsive to said output of said coolant temperature diagnosing circuit for allowing said fail-safe signal to pass.

The present invention will be more apparent from the following description made with reference to the accompanying drawings.

DETAILED DESCRIPTION OF THE PREFERRED EMBODIMENT

Figure 1:
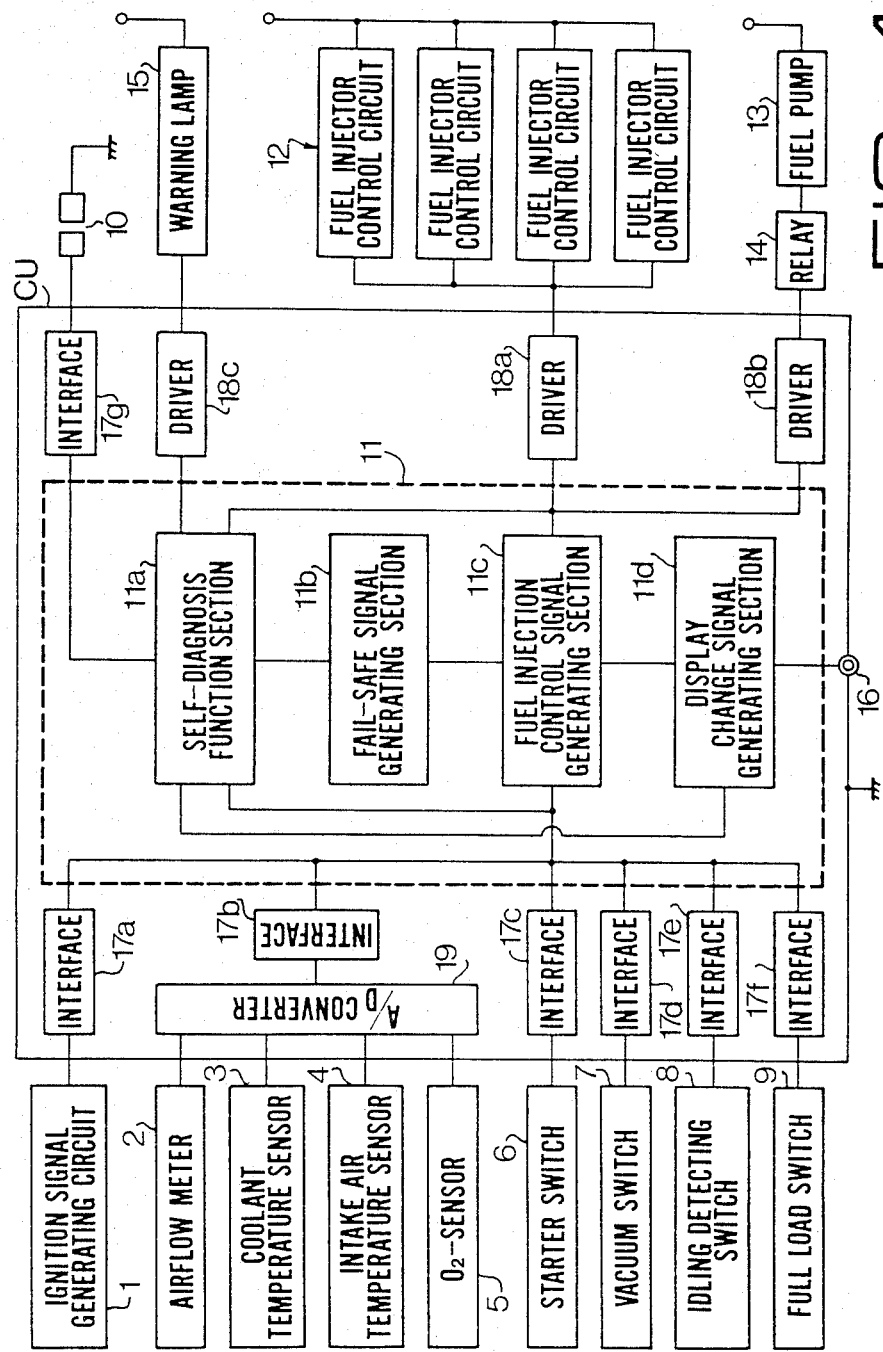
FIG. 1 is a block diagram showing a diagnosis system for operation of an engine.

FIG. 1 diagrammatically shows a diagnosis system for operation of an engine including a system of the present invention. The system comprises an engine operation detecting means group 1 to 9, and a control unit CU. The control unit CU comprises a computor 11 including memories, I/O and timers, an interface group 17a to 17g and, drivers 18a to 18c. The detecting means group comprises an ignition signal generating circuit 1, the output signal of which represents an ignited cylinder of the engine and the ignition timing thereof, an airflow meter 2, a coolant temperature sensor 3, an intake air temperature sensor 4, and an $O_2$-sensor 5 for detecting the oxygen concentration in exhaust gases from the engine. The detecting means group further comprises a starter switch 6 for detecting the operation of the starter of the engine, a vacuum switch 7 for detecting the vacuum in the intake passage of the engine, an idling detecting switch 8 which is operated by a throttle valve shaft at the idling position of the throttle valve, and a full load switch 9 which is also operated by the throttle valve shaft at a wide open throttle position of the throttle valve. The computer 11 comprises a self-diagnosis function section 11a, a fail-safe signal generating section 11b, a fuel injection control signal generating section 11c and a display change signal generating section 11d. The self-diagnosis function section 11a is connected to a terminal 10 for checking fault. When the terminal 10 is connected to the ground at a shop, a fault condition memorized in the display change signal generating section 11d is displayed by a lamp 16. Further, outputs of switches 6 to 9 are applied to sections 11a and 11c through interfaces 17c to 17f, respectively.

The self-diagnosis function section 11a monitors inputs from the engine operation detecting means group 1 to 9 and when any fault is detected, a signal is sent to a warning lamp 15 through the driver 18c to warn of the fault. Further, upon the occurrence of serious engine trouble which would stall the engine, the self-diagnosis function section 11a sends a diagnosis signal dependent on the kind of the engine trouble to the fail-safe signal generating section 11b. The fail-safe signal generating section 11b stores a plurality of data to avoid the stalling of the engine caused by the engine trouble and produces a fail-safe signal dependent on the diagnosis signal. The fail-safe signal is fed to the fuel injection control signal generating section 11c which operates so as to stop the input from the detecting means group 1 to 9.

In normal engine operation, the fuel injection control signal generating section 11c operates to produce an air-fuel ratio control signal by computing the inputs applied from the engine operation detecting means group 1 to 9. The air-fuel ratio control signal is fed to a fuel pump 13 through the driver 18b and a relay 14 and to fuel injector control circuits 12 through the driver 18a so as to inject a proper amount of fuel at a proper time. Further, the fuel injection control signal generating section 11c sends a signal to the switching section 11d in response to an input from the $O_2$-sensor 5. The switching section 11d sends a signal to a monitor lamp 16 in response to the signal from the fuel injection control signal generating section 11c to indicate the fact that the exhaust gases concentration is normal.

When the fail-safe signal is fed from the fail-safe signal generating section 11b to the fuel injector control signal generating section 11c, the section 11c produces a quasi air-fuel ratio control signal dependent on the fail-safe signal. The quasi air-fuel ratio control signal is sent to the fuel injection control circuits 12, so that the engine continues to operate in accordance with the quasi signal without stalling.

Further, the switching section 11d sends a signal to the lamp 16 in dependency on the diagnosis signal fed from the self-diagnosis function 11a. The lamp 16 intermittently lights in accordance with a pattern which is decided by the diagnosis signal by connecting the terminal 10 to the ground at a shop. An inspector in the shop can recognize the kind of the engine trouble by the pattern of the lighting of the lamp 16.

In accordance with the present invention, when fault occurs in the coolant temperature sensor system, the self-diagnosis function section 11a generates a signal and the signal is fed to the fail-safe signal generating section 11b.

Figure 2:
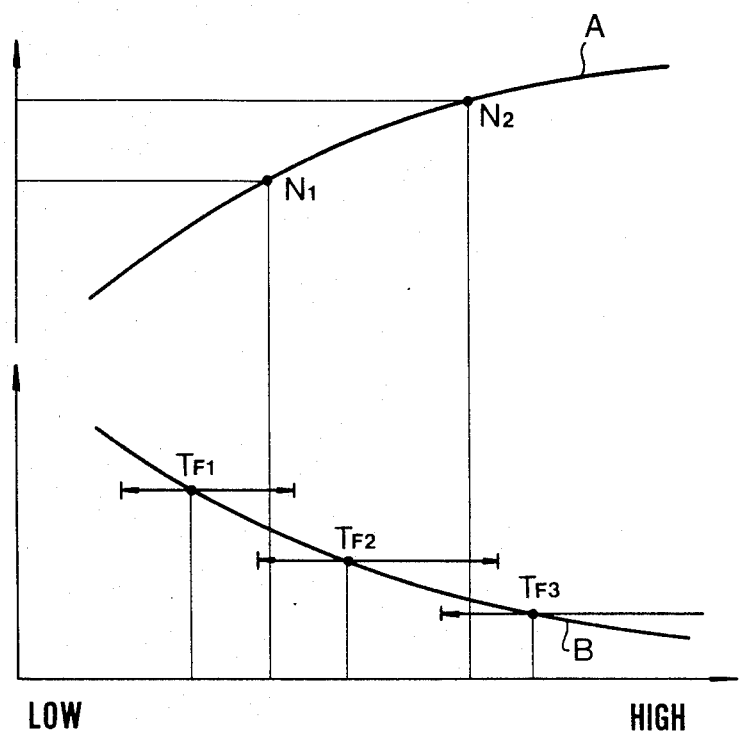
FIG. 2 is a graph showing a relationship between engine speed and quasi signals in the system of the present invention.

Referring to FIG. 2, curve A shows engine speed, in which $N_1$ is an engine speed at cranking of an engine and $N_2$ is an engine speed at idling of the started engine. Curve B shows fail-safe values $TF_1$, $TF_2$ and $TF_3$ dependent on the engine speed.

Figure 3:
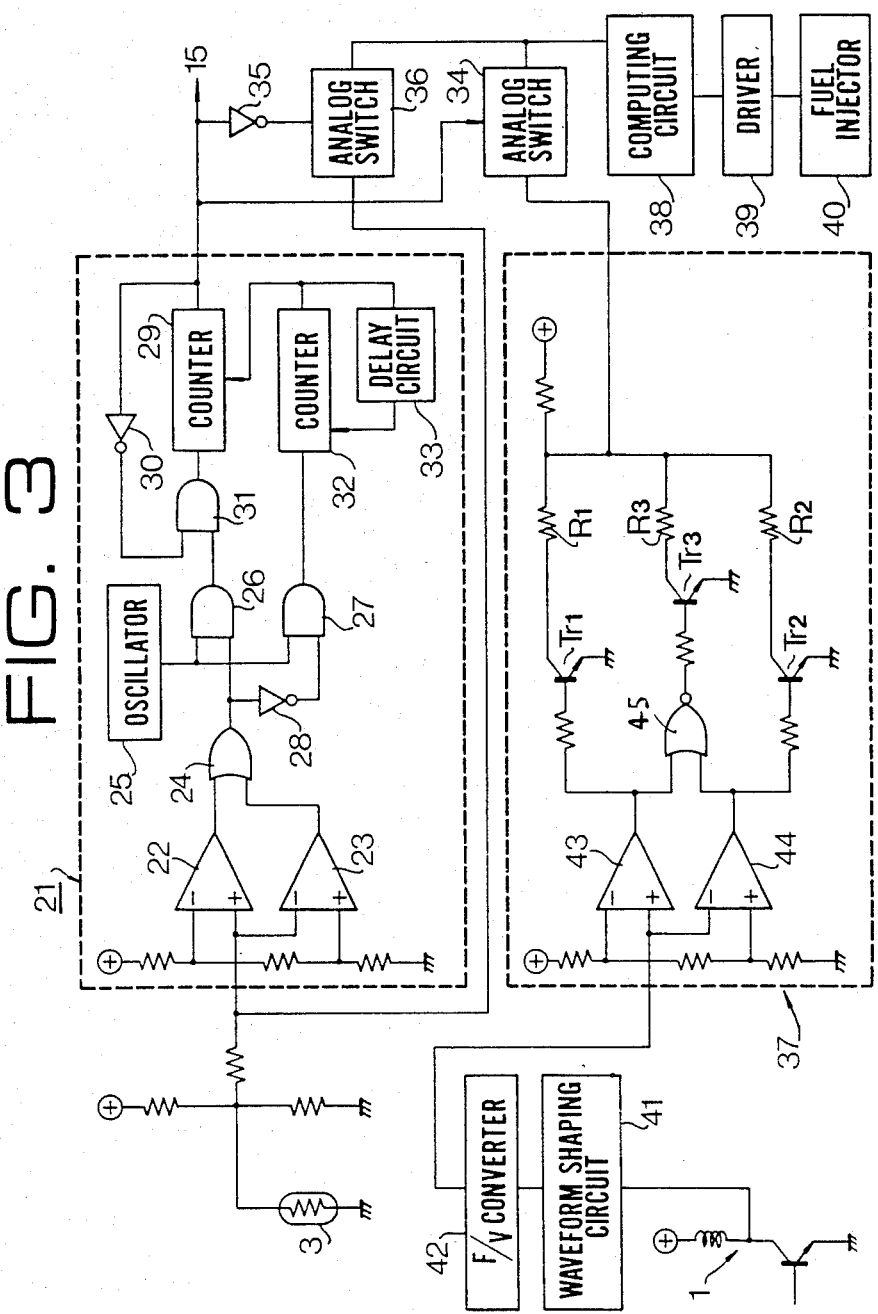
FIG. 3 is a coolant temperature sensor diagnosing circuit according to the present invention.

FIG. 3 shows a diagnosing circuit 21 for coolant temperature, which is included in the self-diagnosis function section 11a (FIG. 1), and a fail-safe generating circuit 37 which is included in the fail-safe signal generating section 11b. The output of the coolant temperature sensor 3 is fed to a window comparator comprising comparators 22 and 23 and an OR gate 24, in the coolant temperature diagnosing circuit 21, and further fed to a computing circuit 38 through an analog switch 36. The output of the window comparator is applied to an AND gate 26 and also applied to an AND gate 27 through an inverter 28. AND gates 26 and 27 are applied with pulses from an oscillator 25 to produce pulses dependent on the outputs of the window comparator.

The coolant temperature diagnosing circuit 21 is provided with a first counter 29 for detecting the coolant temperature and a second counter 32 for resetting the first counter 29.

If the output voltage of the coolant temperature sensor exceeds a predetermined range of the window comparator, the output of the OR gate 24 becomes high, so that the AND gate 26 produces pulses. The pulses are applied to the counter 29 through an AND gate 31. When the count of the counter 29 exceeds a set count upon a fault of the sensor, the counter 29 produces a high level output. The output is applied to the other input of the AND gate 31 through an inverter 30, so that the AND gate 31 is closed to hold the output of the counter 29. The output of the counter 29 is applied a control gate of an analog switch 34 to close it and also applied to the control gate of the analog switch 36 through an inverter 35 to open the switch.

It is necessary to reset the counter 29, if the trouble in the coolant temperature sensor recovers after a short time. The counter 32 is to reset the counter 29. The output of the OR gate 24 is at a low level in normal operating conditions, so that the AND gate 27 is opened to produce pulses. When the number of pulses applied to the counter 32 reaches a predetermined value which corresponds to the above described short time, the counter 32 produces an output. The output is applied to a reset terminal of the counter 29 to reset it and also applied to its own reset terminal through a delay circuit 33. Thus, the reset operation of the counters 29 and 32 is repeated a long as the coolant temperature sensor 3 is in normal condition. When a fault occurs in the coolant temperature sensor and the analog switch 34 is closed by the output of the counter 29, a fail-safe signal from the fail-safe signal generating circuit 37 is fed to the computing circuit 38 through the switch 34. The computing circuit 38 produces a quasi air-fuel ratio control signal in response to the fail-safe signal. The quasi air-fuel ratio control signal is fed to a fuel injector 40 through a driver 39 to inject the fuel at a proper air-fuel ratio so as to keep the engine operation. In addition, the output of the counter 29 is fed to the lamp 15 for warning of the fault.

The fail-safe signal generating circuit 37 is adapted to produce three kinds of fail-safe signals in dependency on engine speed. The engine speed signal is produced by a waveform shaping circuit 41 for shaping ignition pulses from the ignition signal generating circuit 1 and by a frequency-to-voltage (F/V) converter 42 and is applied to a window comparator comprising comparators 43 and 44 and a NOR gate 45. The outputs of the comparators 43 and 44 are applied to bases of transistors $Tr_1$ and $Tr_2$, respectively, and the output of the NOR gate 45 is applied to a base of transistor $Tr_3$.

When engine speed exceeds the engine speed $N_2$, the comparator 43 produces a high level output voltage which turns on the transistor $Tr_1$. When engine speed decreases below the engine speed $N_1$, the comparator 44 produces a high level output voltage, so that the transistor $Tr_2$ is turned on.

Between $N_1$ and $N_2$, the outputs of comparators 43 and 44 are at low levels, so that the output of the NOR gate 45 becomes high, turning on the transistor $Tr_3$. Thus, one of three voltages decided by resistors $R_1$, $R_2$ and $R_3$ is applied to the computing circuit 38 as a fail-safe signal in dependency on the engine speed so as to prevent stalling of the engine.

While the presently referred embodiment of the present invention has been shown and described, it is to be understood that this disclosure is for the purpose of illustration and that various charges and modifications may be made without departing from the spirit and scope of the invention as set forth in the appended claims.

What is claimed is:

1. In a system for diagnosing an internal combustion engine having a coolant temperature sensor, the improvement comprising a coolant temperature diagnosing circuit responsive to output voltage of said coolant temperature sensor for producing an output when said output voltage exceeds a predetermined range;

means for generating an output voltage dependent on engine speed;

a fail-safe signal generating circuit responsive to said output voltage of said means for producing one of fail-safe signals in dependency on said output voltage of said means; and switch means responsive to said output of said coolant temperature diagnosing circuit for allowing said fail-safe signal to pass.

2. The system for diagnosing an internal combustion engine according to claim 2 wherein said coolant temperature diagnosing circuit comprises a comparator, means for changing the output of said comparator to pulses, and a counter for counting said pulses, said counter being adapted to produce an output when the count reaches a predetermined count.

* * * * *